US007311276B2

(12) United States Patent
Matlin et al.

(10) Patent No.: US 7,311,276 B2
(45) Date of Patent: Dec. 25, 2007

(54) SHREDDER WITH PROXIMITY SENSING SYSTEM

(75) Inventors: Taihoon K Matlin, Round Lake Beach, IL (US); Eric Gach, Mount Prospect, IL (US)

(73) Assignee: Fellowes Inc., Itasca, IL (US)

( * ) Notice: Subject to any disclaimer, the term of this patent is extended or adjusted under 35 U.S.C. 154(b) by 17 days.

(21) Appl. No.: 10/937,304

(22) Filed: Sep. 10, 2004

(65) Prior Publication Data

US 2006/0054724 A1 Mar. 16, 2006

(51) Int. Cl.
*A01F 21/00* (2006.01)
*B02C 23/00* (2006.01)
*B23Q 11/00* (2006.01)

(52) U.S. Cl. ...................................... 241/37.5; 241/236

(58) Field of Classification Search ............... 241/37.5, 241/236

See application file for complete search history.

(56) References Cited

U.S. PATENT DOCUMENTS 3,619,537 A 11/1971 Nara et al.
3,764,819 A 10/1973 Muller
3,829,850 A 8/1974 Guetersloh
3,947,734 A * 3/1976 Fyler .......................... 361/181
4,352,980 A 10/1982 Hibari
4,683,381 A 7/1987 Dufoug
5,081,406 A 1/1992 Hughes et al.
5,166,679 A 11/1992 Vranish et al.
5,186,398 A 2/1993 Vigneaux, Jr.
5,345,138 A 9/1994 Mukaidono et al.
5,397,890 A 3/1995 Schueler et al.
5,494,229 A 2/1996 Rokos
5,850,342 A 12/1998 Nakamura et al.
D412,716 S 8/1999 Kroger
5,942,975 A 8/1999 Sorensen
6,065,696 A 5/2000 Tsai
6,079,645 A * 6/2000 Henreckson et al. ....... 241/37.5
6,265,682 B1 7/2001 Lee
6,376,939 B1 4/2002 Suzuki et al.
6,418,004 B1 7/2002 Mather et al.
6,655,943 B1 * 12/2003 Peterson et al. ............ 425/114
6,676,460 B1 1/2004 Motsenbocker
6,724,324 B1 * 4/2004 Lambert ...................... 341/33
6,813,983 B2 11/2004 Gass et al.
6,826,988 B2 12/2004 Gass et al.
6,857,345 B2 2/2005 Gass et al.
6,877,410 B2 4/2005 Gass et al.
6,880,440 B2 4/2005 Gass et al.

(Continued)

FOREIGN PATENT DOCUMENTS

DE 33 13 232 10/1984

(Continued)

OTHER PUBLICATIONS

SEM Advertisement for LK-3 Automatic Oiling System.

(Continued)

*Primary Examiner*—Bena Miller
(74) *Attorney, Agent, or Firm*—Pillsbury Winthrop Shaw Pittman LLP

(57) ABSTRACT

The present invention relates to a shredder that includes a proximity sensing system to sense the presence of a person, animal, or object near cutting elements of the shredder.

114 Claims, 9 Drawing Sheets

U.S. PATENT DOCUMENTS

| | | | |
|---|---|---|---|
| 6,920,814 | B2 | 7/2005 | Gass et al. |
| 6,979,813 | B2 * | 12/2005 | Avril .......................... 250/221 |
| 7,040,559 | B2 | 5/2006 | Matlin et al. |
| 2002/0017175 | A1 | 2/2002 | Gass et al. |
| 2002/0017176 | A1 | 2/2002 | Gass et al. |
| 2002/0017178 | A1 | 2/2002 | Gass et al. |
| 2002/0017179 | A1 | 2/2002 | Gass et al. |
| 2002/0017180 | A1 | 2/2002 | Gass et al. |
| 2002/0017181 | A1 | 2/2002 | Gass et al. |
| 2002/0017182 | A1 | 2/2002 | Gass et al. |
| 2002/0017184 | A1 | 2/2002 | Gass et al. |
| 2002/0017336 | A1 | 2/2002 | Gass et al. |
| 2002/0020261 | A1 | 2/2002 | Gass et al. |
| 2002/0020262 | A1 | 2/2002 | Gass et al. |
| 2002/0020263 | A1 | 2/2002 | Gass et al. |
| 2002/0020265 | A1 | 2/2002 | Gass et al. |
| 2002/0020271 | A1 | 2/2002 | Gass et al. |
| 2002/0056348 | A1 | 5/2002 | Gass et al. |
| 2002/0056349 | A1 | 5/2002 | Gass et al. |
| 2002/0056350 | A1 | 5/2002 | Gass et al. |
| 2002/0059853 | A1 | 5/2002 | Gass et al. |
| 2002/0059854 | A1 | 5/2002 | Gass et al. |
| 2002/0059855 | A1 | 5/2002 | Gass et al. |
| 2002/0066346 | A1 | 6/2002 | Gass et al. |
| 2002/0069734 | A1 | 6/2002 | Gass et al. |
| 2002/0170399 | A1 | 11/2002 | Gass et al. |
| 2002/0170400 | A1 | 11/2002 | Gass |
| 2002/0190581 | A1 | 12/2002 | Gass et al. |
| 2003/0002942 | A1 | 1/2003 | Gass et al. |
| 2003/0005588 | A1 | 1/2003 | Gass et al. |
| 2003/0015253 | A1 | 1/2003 | Gass et al. |
| 2003/0019341 | A1 | 1/2003 | Gass et al. |
| 2003/0020336 | A1 | 1/2003 | Gass et al. |
| 2003/0037651 | A1 | 2/2003 | Gass et al. |
| 2003/0056853 | A1 | 3/2003 | Gass et al. |
| 2003/0058121 | A1 | 3/2003 | Gass et al. |
| 2003/0090224 | A1 | 5/2003 | Gass et al. |
| 2003/0131703 | A1 | 7/2003 | Gass et al. |
| 2003/0140749 | A1 | 7/2003 | Gass et al. |
| 2003/0196824 | A1 | 10/2003 | Gass et al. |
| 2004/0008122 | A1 * | 1/2004 | Michael ................... 340/686.1 |
| 2004/0040426 | A1 | 3/2004 | Gass et al. |
| 2004/0163514 | A1 | 8/2004 | Gass et al. |
| 2004/0173430 | A1 | 9/2004 | Gass |
| 2004/0194594 | A1 | 10/2004 | Dils et al. |
| 2004/0226800 | A1 | 11/2004 | Pierga et al. |
| 2005/0039586 | A1 | 2/2005 | Gass et al. |
| 2005/0039822 | A1 | 2/2005 | Gass et al. |
| 2005/0041359 | A1 | 2/2005 | Gass |
| 2005/0066784 | A1 | 3/2005 | Gass |
| 2005/0103510 | A1 | 5/2005 | Gass et al. |
| 2005/0139051 | A1 | 6/2005 | Gass et al. |
| 2005/0139056 | A1 | 6/2005 | Gass et al. |
| 2005/0139057 | A1 | 6/2005 | Gass et al. |
| 2005/0139058 | A1 | 6/2005 | Gass et al. |
| 2005/0139459 | A1 | 6/2005 | Gass et al. |
| 2005/0155473 | A1 | 7/2005 | Gass |
| 2005/0166736 | A1 | 8/2005 | Gass et al. |
| 2006/0091247 | A1 | 5/2006 | Matlin |

FOREIGN PATENT DOCUMENTS

| | | |
|---|---|---|
| DE | 86 19 856.4 | 10/1988 |
| DE | 41 21 330 | 1/1993 |
| EP | 855 221 A | 7/1998 |
| JP | 52-11691 | 1/1977 |
| JP | 57-76734 | 5/1982 |
| JP | 04-157093 | 5/1992 |
| JP | 040180852 | 6/1992 |
| JP | 6-277548 | 10/1994 |
| JP | 7-299377 | 11/1995 |
| JP | 9-262491 | 10/1997 |
| JP | 11-216383 | 8/1999 |
| JP | 20000346288 | 12/2000 |
| JP | 2004321993 | 11/2004 |
| WO | WO2005070553 | 8/2005 |

OTHER PUBLICATIONS

Advertisement for Auto-Lube.

1st Paper Shredder—Advertisement for DAHLE Automatic Oiler/Paper Shredder Oiling Accessory.

Instructions for Installing a Shredder Oiling System from www.compax.com.

Full-Size Picture of Shredder with LK-3 Oiling System.

International Search Report and Written Opinion for PCT/US2005/028290 dated Nov. 21, 2005.

Ti's Digital Signal Controllers Put Brake On SawStop Table Saw, Feb. 9, 2005, pp. 1-3 (printed from www.embeddedstar.com/press/content/2005/2/embedded17827.html).

* cited by examiner

SHREDDER WITH PROXIMITY SENSING SYSTEM

FIELD OF THE INVENTION

The present invention relates to shredders for destroying articles, such as documents, CDs, etc.

BACKGROUND OF THE INVENTION

Shredders are well known devices for destroying articles, such as documents, CDs, floppy disks, etc. Typically, users purchase shredders to destroy sensitive articles, such as credit card statements with account information, documents containing company trade secrets, etc.

A common type of shredder has a shredder mechanism contained within a housing that is removably mounted atop a container. The shredder mechanism typically has a series of cutter elements that shred articles fed therein and discharge the shredded articles downwardly into the container. It is generally desirable to prevent a person's or animal's body part from contacting these cutter elements during the shredding operation.

The present invention endeavors to provide various improvements over known shredders.

SUMMARY OF THE INVENTION

One aspect of the present invention provides a shredder comprising a housing, a shredder mechanism including a motor and cutter elements, a proximity sensor, and a controller. The shredder mechanism enables articles to be shredded to be fed into the cutter elements, and the motor is operable to drive the cutter elements so that the cutter elements shred the articles fed therein.

The housing has an opening enabling articles to be fed therethrough into the cutter elements of the shredder mechanism for shredding. The proximity sensor is located adjacent the opening and configured to indicate the presence of a person or animal in proximity to the opening. The controller is operable to perform a predetermined operation (e.g., to disable the shredder mechanism) responsive to the indicated presence of the person or animal.

Another aspect of the invention provides a shredder with a proximity sensor that includes an electroconductive element and circuitry to sense a state of the electroconductive element. The proximity sensor is configured to indicate a change in the state of the electroconductive element corresponding to a change in capacitance caused by a person or animal approaching in proximity to the electroconductive element. A controller of the shredder is operable to perform a predetermined operation responsive to the indicated change in the state of the electroconductive element.

Other objects, features, and advantages of the present invention will become apparent from the following detailed description, the accompanying drawings, and the appended claims.

DETAILED DESCRIPTION OF THE ILLUSTRATED EMBODIMENTS

Figure 1:
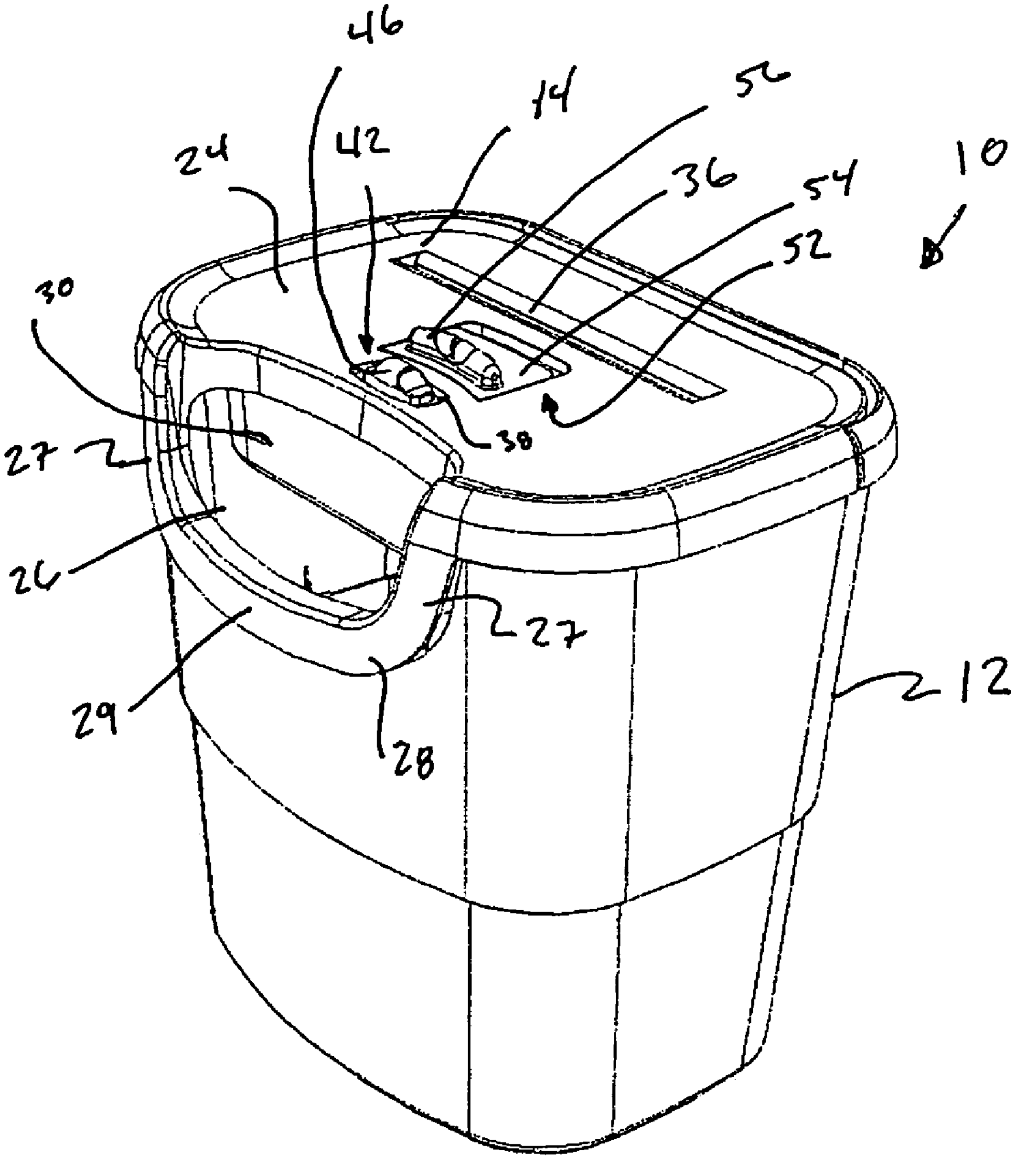
FIG. 1 is a perspective view of a shredder constructed in accordance with an embodiment of the present invention.
Figure 2:
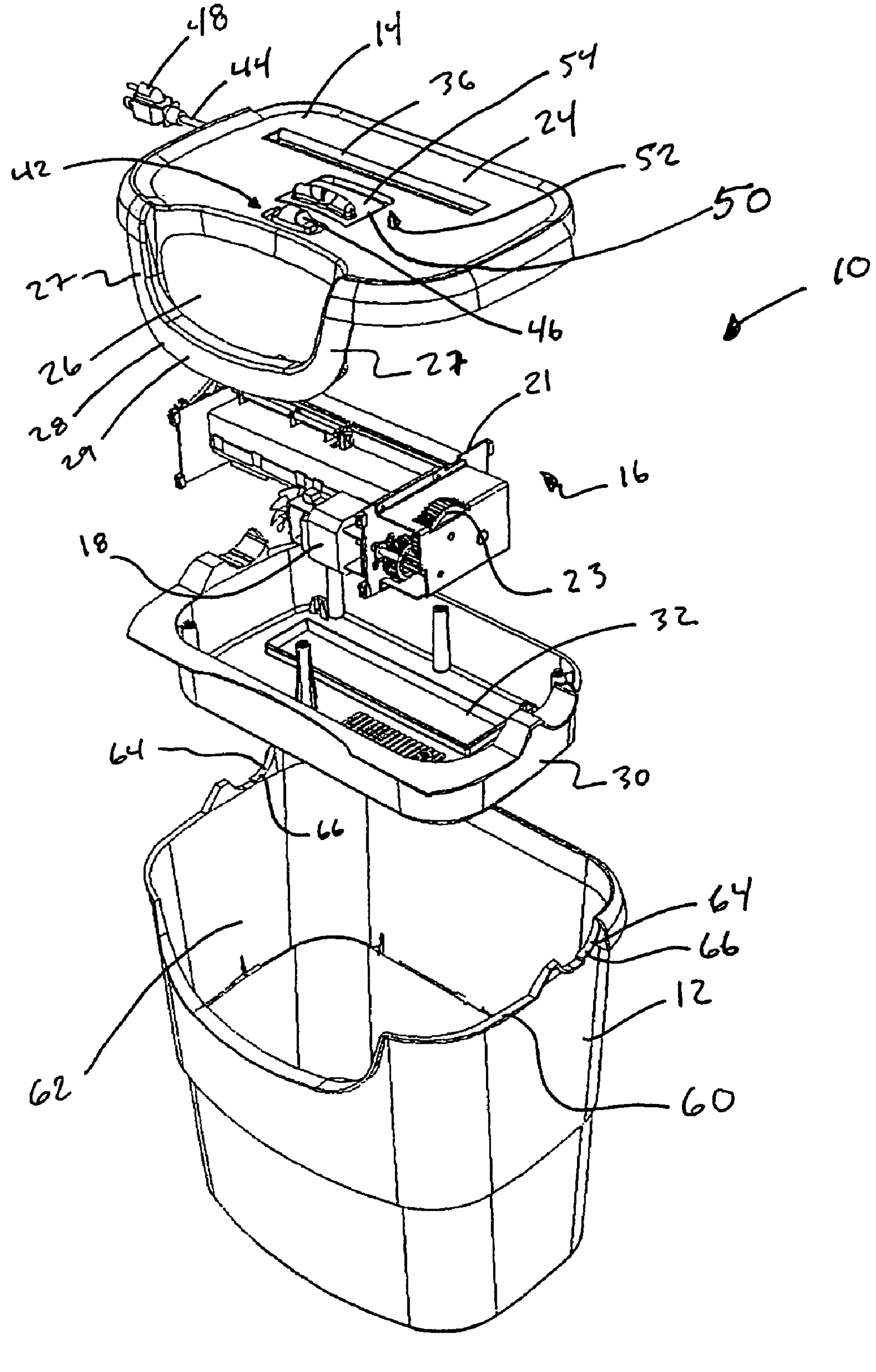
FIG. 2 is an exploded perspective view of the shredder of FIG. 1.

FIGS. 1 and 2 illustrate a shredder constructed in accordance with an embodiment of the present invention. The shredder is generally indicated at 10. The shredder 10 sits atop a waste container, generally indicated at 12, which is formed of molded plastic or any other material. The shredder 10 illustrated is designed specifically for use with the container 12, as the shredder housing 14 sits on the upper periphery of the waste container 12 in a nested relation. However, the shredder 10 may also be designed so as to sit atop a wide variety of standard waste containers, and the shredder 10 would not be sold with the container. Likewise, the shredder 10 could be part of a large freestanding housing, and a waste container would be enclosed in the housing. An access door would provide for access to and removal of the container. Generally speaking, the shredder 10 may have any suitable construction or configuration and the illustrated embodiment is not intended to be limiting in any way.

The shredder 10 includes a shredder mechanism 16 including an electrically powered motor 18 and a plurality of cutter elements (not shown). "Shredder mechanism" is a generic structural term to denote a device that shreds articles using cutter elements. Such shredding may be done in any particular way. The cutter elements are mounted on a pair of parallel rotating shafts (not shown). The motor 18 operates using electrical power to rotatably drive the shafts and the cutter elements through a conventional transmission 23 so that the cutter elements shred articles fed therein. The shredder mechanism 16 may also include a sub-frame 21 for mounting the shafts, the motor 18, and the transmission 23. The operation and construction of such a shredder mechanism 16 are well known and need not be described herein in detail. Generally, any suitable shredder mechanism 16 known in the art or developed hereafter may be used.

The shredder 10 also includes the shredder housing 14, mentioned above. The shredder housing 14 includes top wall 24 that sits atop the container 12. The top wall 14 is molded from plastic and an opening 26 is located at a front portion thereof. The opening 26 is formed in part by a downwardly depending generally U-shaped member 28. The U-shaped member 28 has a pair of spaced apart connector portions 27 on opposing sides thereof and a hand grip portion 28 extending between the connector portions 27 in spaced apart relation from the housing 14. The opening 26 allows waste to be discarded into the container 12 without being passed through the shredder mechanism 16, and the member 28 may act as a handle for carrying the shredder 10 separate from the container 12. As an optional feature, this opening 26 may be provided with a lid, such as a pivoting lid, that opens and closes the opening 26. However, this opening in general is optional and may be omitted entirely. Moreover, the shredder housing 14 and its top wall 24 may have any suitable construction or configuration.

The shredder housing 14 also includes a bottom receptacle 30 having a bottom wall, four side walls and an open top. The shredder mechanism 16 is received therein, and the receptacle 30 is affixed to the underside of the top wall 24 by fasteners. The receptacle 30 has an opening 32 in its bottom wall through which the shredder mechanism 16 discharges shredded articles into the container 12.

The top wall 24 has a generally laterally extending opening 36 extending generally parallel and above the cutter elements. The opening 36, often referred to as a throat, enables the articles being shredded to be fed into the cutter elements. As can be appreciated, the opening 36 is relatively narrow, which is desirable for preventing overly thick items, such as large stacks of documents, from being fed into cutter elements, which could lead to jamming. The opening 36 may have any configuration.

The top wall 24 also has a switch recess 38 with an opening therethrough. An on/off switch 42 includes a switch module (not shown) mounted to the top wall 24 underneath the recess 38 by fasteners, and a manually engageable portion 46 that moves laterally within the recess 38. The switch module has a movable element (not shown) that connects to the manually engageable portion 46 through the opening 40. This enables movement of the manually engageable portion 46 to move the switch module between its states.

In the illustrated embodiment, the switch module connects the motor 18 to the power supply (not shown). Typically, the power supply will be a standard power cord 44 with a plug 48 on its end that plugs into a standard AC outlet. The switch 42 is movable between an on position and an off position by moving the portion 46 laterally within the recess 38. In the on position, contacts in the switch module are closed by movement of the manually engageable portion 46 and the movable element to enable a delivery of electrical power to the motor 18. In the off position, contacts in the switch module are opened to disable the delivery of electric power to the motor 18.

As an option, the switch 42 may also have a reverse position wherein contacts are closed to enable delivery of electrical power to operate the motor 18 in a reverse manner. This would be done by using a reversible motor and applying a current that is of a reverse polarity relative to the on position. The capability to operate the motor 18 in a reversing manner is desirable to move the cutter elements in a reversing direction for clearing jams. In the illustrated embodiment, in the off position the manually engageable portion 46 and the movable element would be located generally in the center of the recess 38, and the on and reverse positions would be on opposing lateral sides of the off position.

Generally, the construction and operation of the switch 42 for controlling the motor 42 are well known and any construction for such a switch 42 may be used.

The top cover 24 also includes another recess 50 associated with a switch lock 52. The switch lock 52 includes a manually engageable portion 54 that is movable by a user's hand and a locking portion (not shown). The manually engageable portion 54 is seated in the recess 50 and the locking portion is located beneath the top wall 24. The locking portion is integrally formed as a plastic piece with the manually engageable portion 54 and extends beneath the top wall 24 via an opening formed in the recess 50.

The switch lock 52 causes the switch 42 to move from either its on position or reverse position to its off position by a camming action as the switch lock 52 is moved from a releasing position to a locking position. In the releasing position, the locking portion is disengaged from the movable element of the switch 42, thus enabling the switch 42 to be moved between its on, off, and reverse positions. In the locking position, the movable element of the switch 42 is restrained in its off position against movement to either its on or reverse position by the locking portion of the switch lock 52.

Preferably, but not necessarily, the manually engageable portion 54 of the switch lock 52 has an upwardly extending projection 56 for facilitating movement of the switch lock 52 between the locking and releasing positions.

One advantage of the switch lock 52 is that, by holding the switch 42 in the off position, to activate the shredder mechanism 16 the switch lock 52 must first be moved to its releasing position, and then the switch 42 is moved to its on or reverse position. This reduces the likelihood of the shredder mechanism 16 being activated unintentionally.

In the illustrated embodiment, the shredder housing 14 is designed specifically for use with the container 12 and it is intended to sell them together. The upper peripheral edge 60 of the container 12 defines an upwardly facing opening 62, and provides a seat 61 on which the shredder 10 is removably mounted. The seat 61 includes a pair of pivot guides 64 provided on opposing lateral sides thereof. The pivot guides 64 include upwardly facing recesses 66 that are defined by walls extending laterally outwardly from the upper edge 60 of the container 12. The walls defining the recesses 66 are molded integrally from plastic with the container 12, but may be provided as separate structures and formed from any other material. At the bottom of each recess 66 is provided a step down or ledge providing a generally vertical engagement surface 68. This step down or ledge is created by two sections of the recesses 66 being provided with different radii.

The shredder 10 has a proximity sensor to detect the presence of a person or thing (e.g., animal or inanimate object) in proximity to the opening 36. A person or thing is "in proximity" to the opening 36 when a part thereof is outside and adjacent to the opening 36 or at least partially within the opening 36. The proximity sensor may be implemented in various ways, such as is described in further detail below. For further examples of shredders on which a proximity sensor may be used, reference may be made to U.S. patent application Ser. No. 10/828,254 (filed Apr. 21, 2004), Ser. No. 10/815,761 (filed Apr. 2, 2004), and Ser. No. 10/347,700 (filed Jan. 22, 2003), each of which is hereby incorporated into the present application by reference. Generally, the proximity sensor may be used with any type of shredder, and the examples identified herein are not intended to be limiting.

Figure 3:
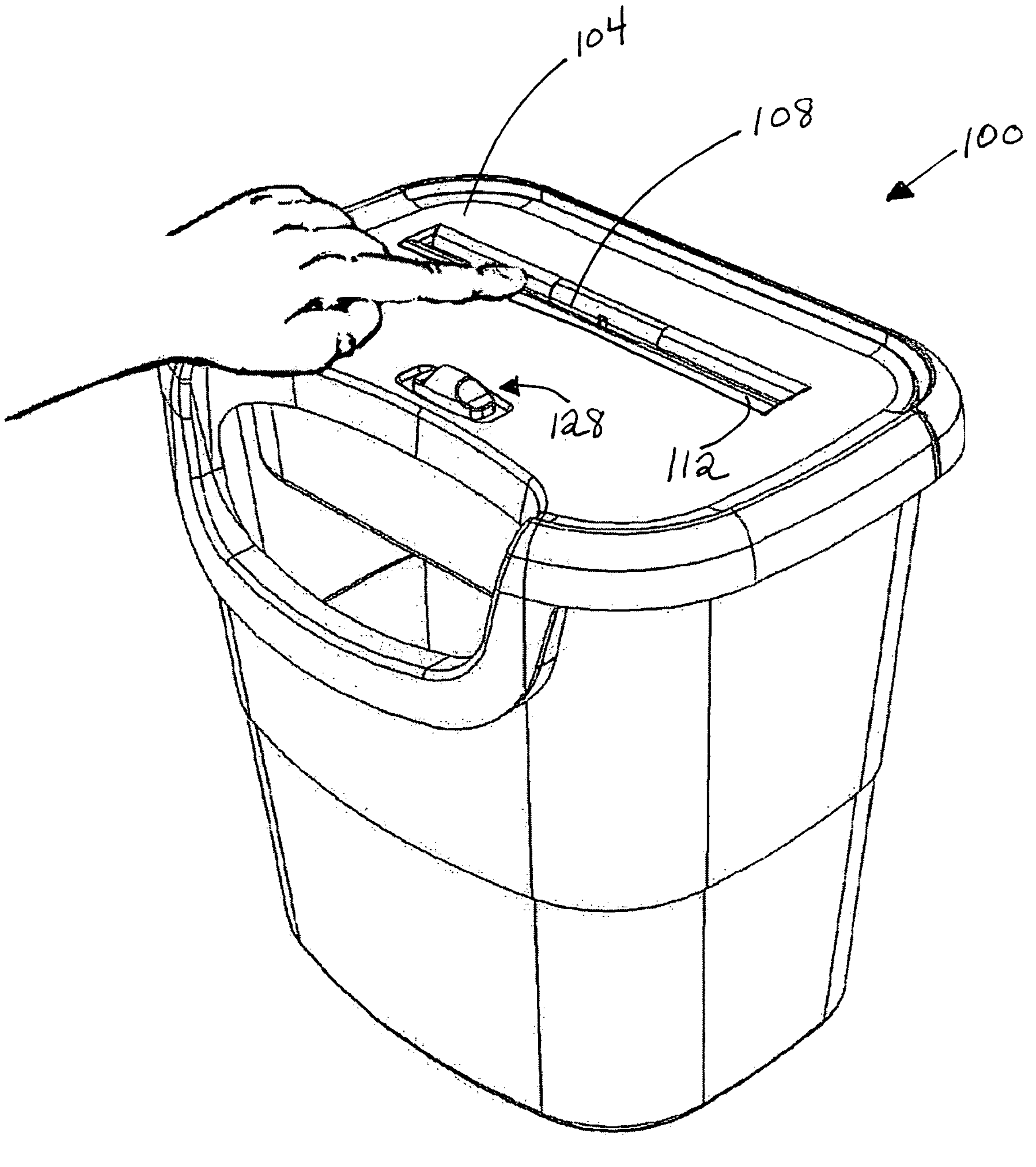
FIG. 3 is a perspective view of a shredder constructed in accordance with an embodiment of the present invention.

FIG. 3 is a perspective view of a shredder 100 constructed in accordance with an embodiment of the present invention. The shredder 100 incorporates a capacitive sensor. The illustrated capacitive sensor is a switch that detects the presence of a person or thing without requiring physical contact. The capacitive sensor includes a conductor/contact plate 112 connected to a circuit, such as those shown in FIGS. 8 and 9. The conductor 112 serves as the first plate of a capacitor, while the person or thing to be detected serves as the second plate thereof. As the distance between the conductor 112 and the person or thing decreases, the mutual capacitance therebetween increases. This increase in capacitance results in increased signal levels in the sensor, which levels can be used to detect the proximity of the person or thing.

It is to be appreciated that capacitance depends in part on the dielectric constant of the second plate of a capacitor. A higher dielectric constant translates into a larger capacitance. Therefore, the capacitive sensor of the shredder 100 can detect the proximity of a nearby animate or inanimate entity provided that its respective dielectric constant is sufficiently high. Because human beings and various animals have relatively high dielectric constants, they are detectable by the capacitive sensor. Inanimate objects with relatively high dielectric constants also are detectable. Conversely, objects with low or moderate dielectric constants, such as paper, are not detectable.

The shredder 100 includes a shredder housing 104, an opening 108, and a control switch 128 with on, off, and reverse positions. A shredder mechanism, such as the one described above, is located beneath the opening 108 so that documents can be fed into the shredder mechanism through the opening 108.

The conductor 112 can be, for example, a strip of metal, foil tape (e.g., copper tape), conductive paint, a silk-screened conductive ink pattern, or another suitable conductive material. As shown in FIG. 3, the conductor 112 is a 9-inch by 1-inch capacitive sensing strip that is affixed to the housing 104 near the opening 108. As such, when a person or thing nears the opening 108 and thus the cutter elements of the shredding mechanism of the shredder 100, the capacitance between the conductor 112 and the person or thing increases, resulting in an increase in the signal level used for detection, as will be described below. To ensure that the switch is sensitive enough to detect the person or thing through multiple sheets of paper, the conductor 112 extends into the opening 108 to increase the overall surface area of the conductor 112 and thus the amount of capacitance between the conductor 112 and the nearby person or thing. The conductor 112 optionally can be covered by non-conductive plastic, for example, thus concealing the switch from a user of the shredder 100. In addition, to increase sensitivity of the switch, such non-conductive plastic can be covered with a conductive material, such as metal foil.

Though not illustrated in FIG. 3, the shredder 100 can include a sensor light, an error light, and/or a light indicative of normal operation. The sensor light, which can be an LED, is illuminated when a person or thing is detected. The error light, which also can be an LED, is illuminated when a person or thing is detected, and optionally under other conditions (e.g., the shredder container is not properly engaged with the shredder 100, or the shredder mechanism has become jammed). These lights, however, are not necessary, and are only optional features.

FIGS. 4-7 are cross-sectional views each showing a shredder housing 104, opening 108, cutting elements 132, and a conductor configuration for a sensor in accordance with various embodiments of the present invention. The conductor configurations can include conductor(s) of different areas to tailor the amount of capacitance and thus the signal level produced when a person or thing nears the shredder. Where multiple conductors are employed, the distance therebetween may be designed also to tailor the amount of capacitive coupling and thus the capacitance produced.

Figure 4:
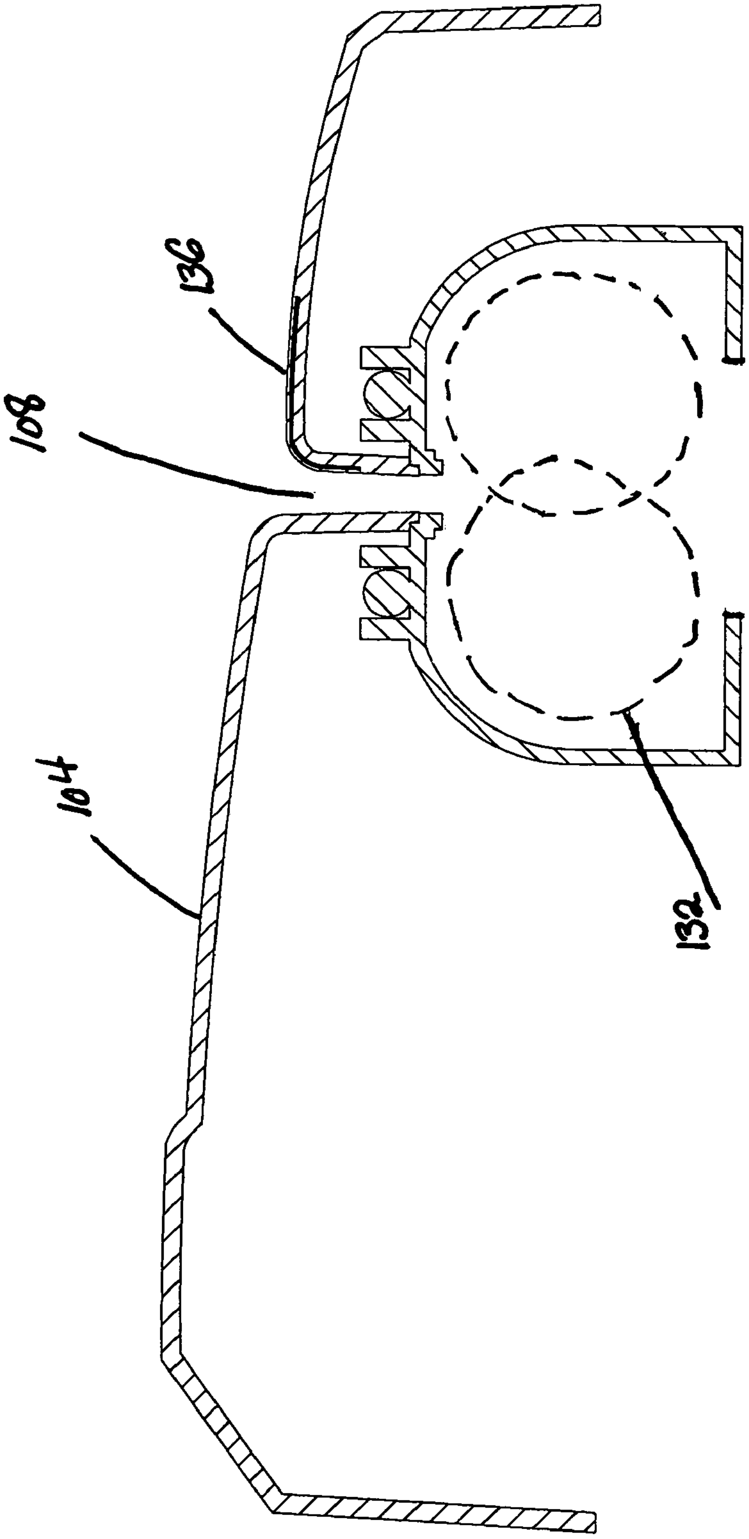
FIGS. 4-7 are cross-sectional views each showing a shredder housing, opening, cutting elements, and conductor configuration for a sensor in accordance with various embodiments of the present invention.

In FIG. 4, the conductor 136 comprises a conductive material embedded within the upper wall of the housing 104 beneath the upper surface partially into the opening 108. The conductor 136 also is optionally embedded in the wall defining the opening 108 and extends along it for a portion.

Figure 5:
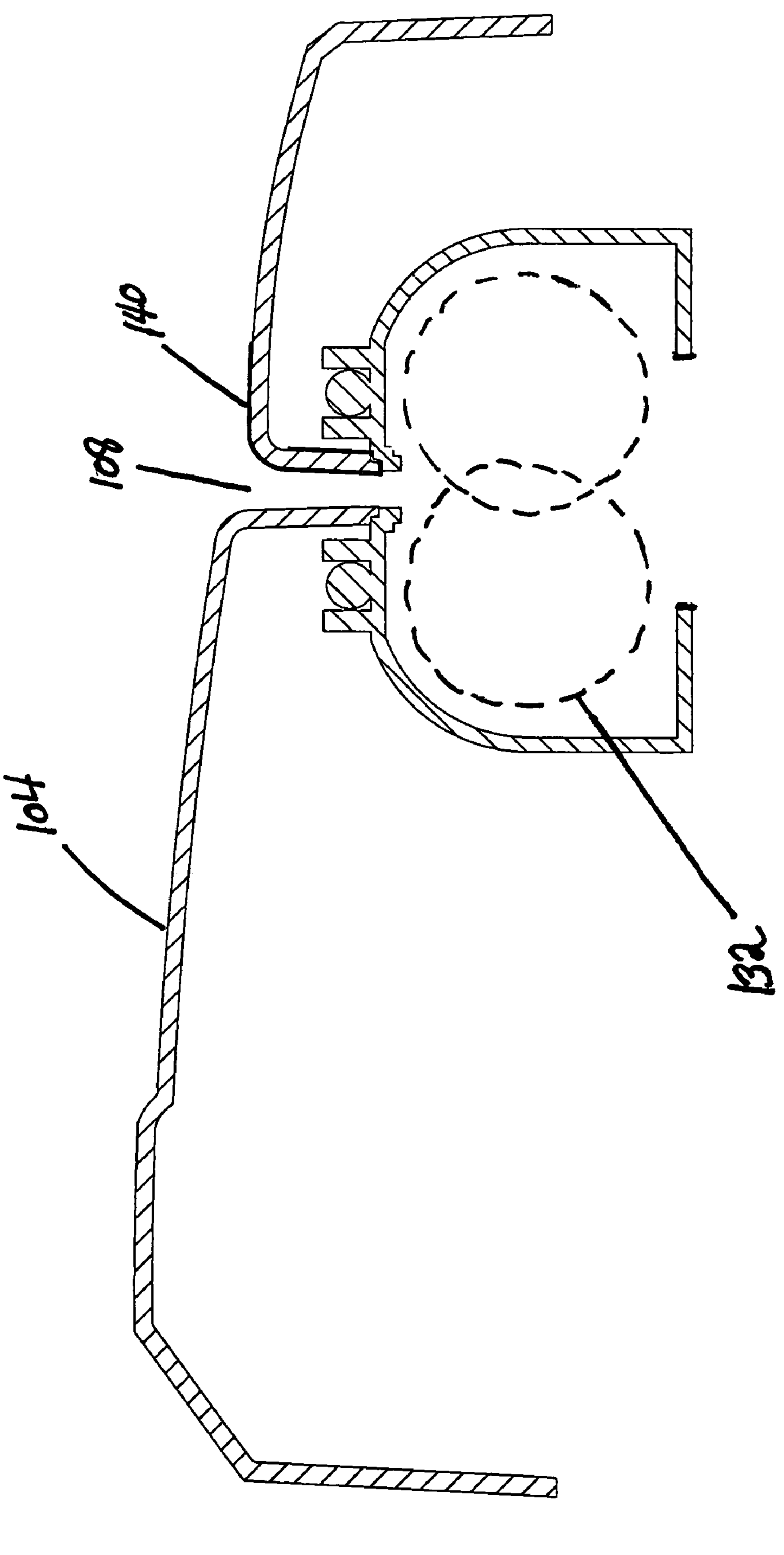

In FIG. 5, the conductive material of the conductor 140 covers an upper surface portion of the housing 104, extends substantially into the opening 108, and curves around a flange of the housing 104 so as to cover an inside surface portion of the housing 104. For a conductor 140 that has a noticeable amount of thickness, the top portion of the upper surface where the conductor 140 is mounted may be recessed.

Figure 6:
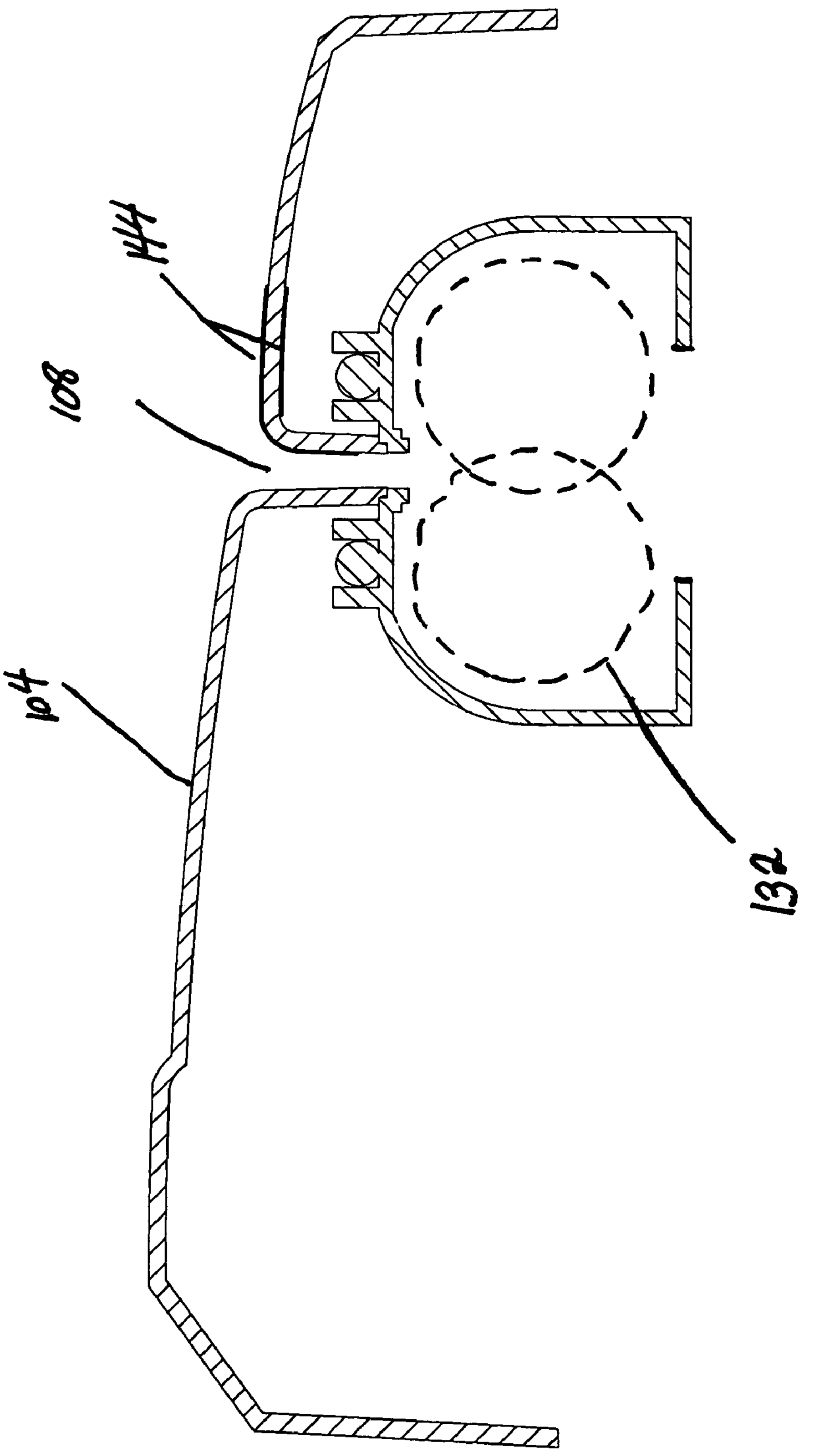

The conductor 144 of FIG. 6 includes two conductive portions respectively affixed to outside and inside surface portions of the housing 104. Such use of multiple portions increases the surface area of the capacitor, as well as the capacitive coupling, capacitance, and signal level produced when a person or thing nears the conductive portions.

Figure 7:
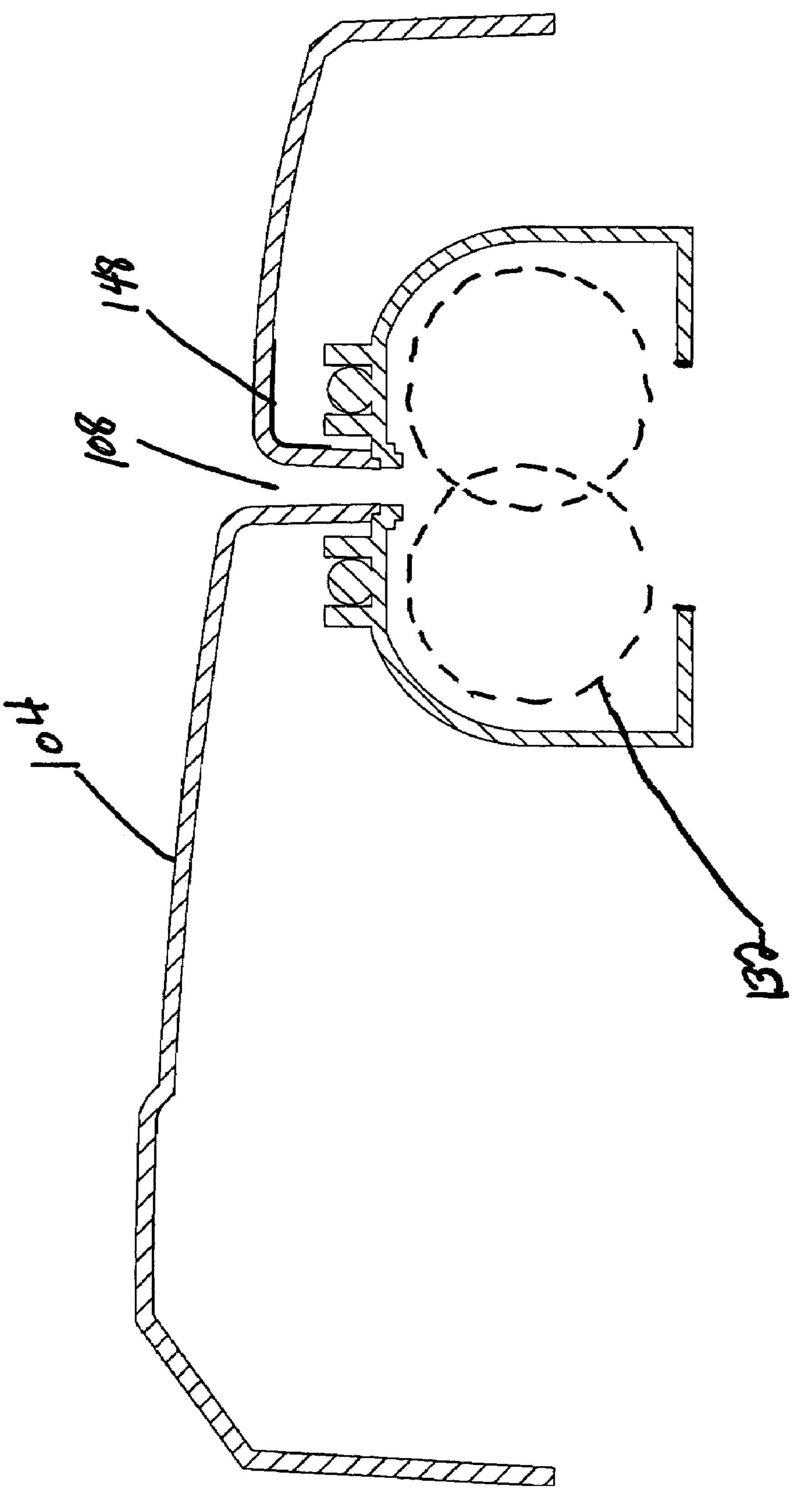

The conductor 148 of FIG. 7 comprises a conductive material on an inside surface portion of the housing 104. This is desirable for concealing the conductor 148 without adding the manufacturing step of embedding the conductor in a housing wall, such as is shown in FIG. 4. It is to be appreciated that the conductors of FIGS. 4-7 may be of any suitable configuration, and the examples illustrated are in no way intended to be limiting.

Figure 8:
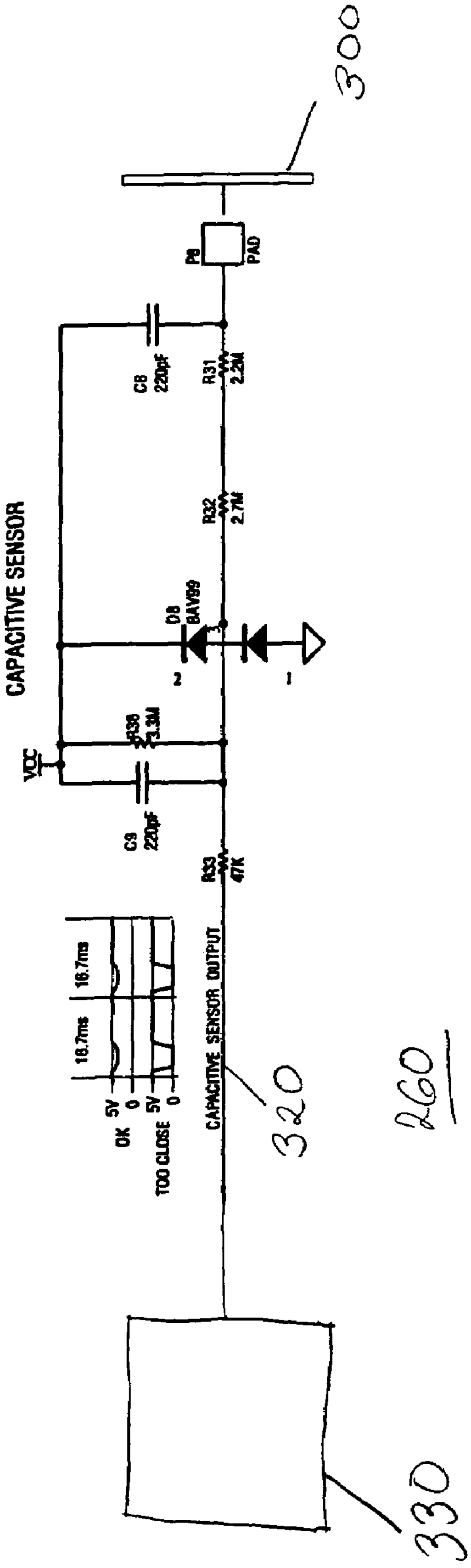
FIGS. 8 and 9 illustrate example capacitive sensor circuits according to respective embodiments of the present invention.
Figure 9:
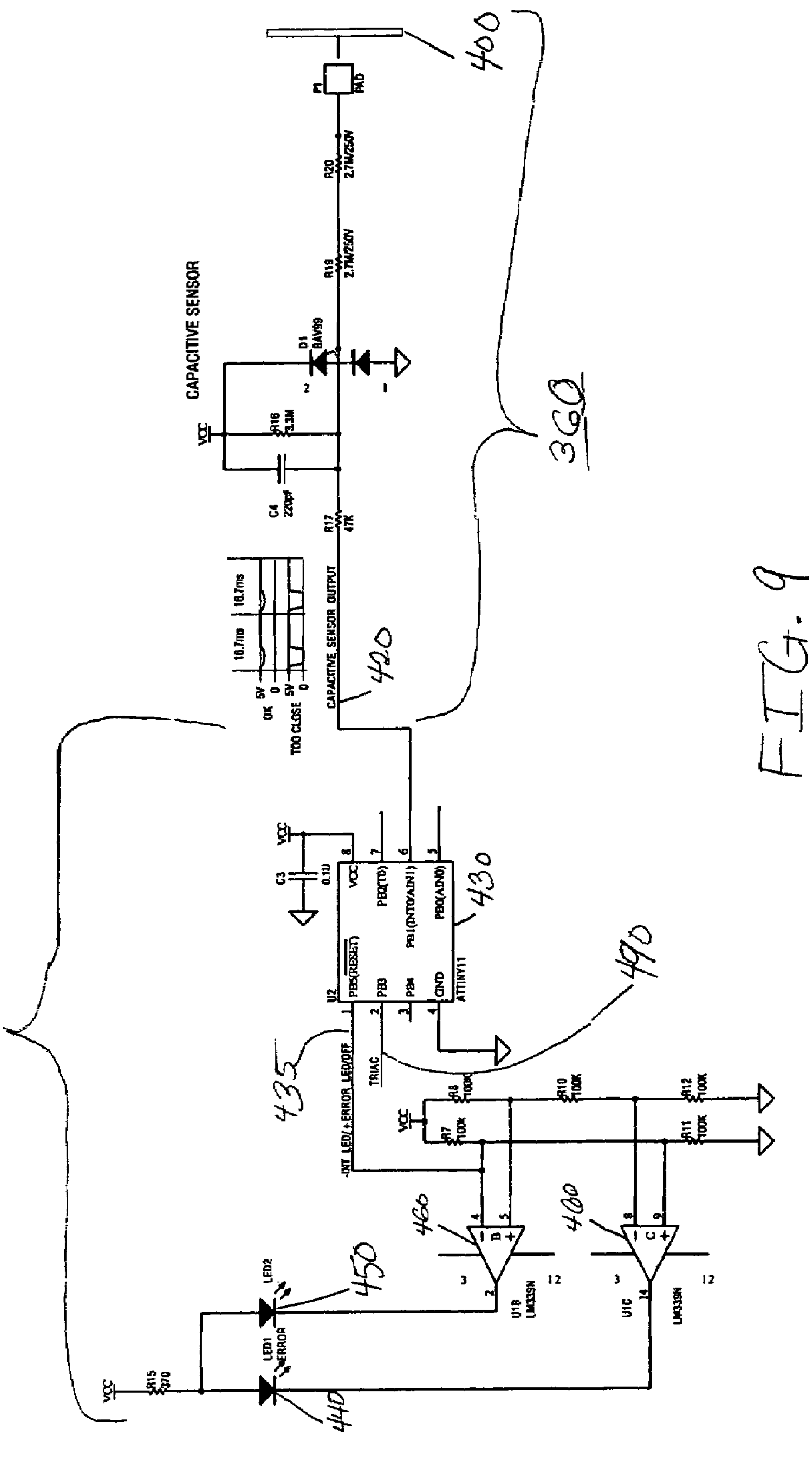

A conductor or conductive material such as described above in connection with FIGS. 3-7 is typically connected to circuitry on a circuit board. FIGS. 8 and 9 illustrate example capacitive sensor circuits according to respective embodiments of the present invention. The example circuits may be incorporated into the overall circuit design of a shredder, and are in no way intended to be limiting.

In FIG. 8, the capacitive sensor circuit 260 includes a conductor 300 that can have a configuration such as shown above or another suitable configuration. The conductor 300 is connected to a pad P8, which is in turn connected to circuit loops including capacitors C8 and C9, resistors R31, R32, and R36, and a high-speed double diode D8. The loops are connected to a voltage supply Vcc, circuit ground, and a resistor R33. The voltage supply Vcc is connected to the AC line voltage of the shredder, and a negative regulator can generate −5 volts for the circuit ground. The capacitive sensor output 320 may be in turn coupled as an input to a controller 330, such as a microprocessor or discrete circuit components (e.g., comparators, transistors), which takes appropriate action in response to signal levels at the output 320. Such a controller 330 may also be a relay switch that opens to disable the delivery of power to an element (e.g., the motor of the shredder mechanism) and closes to enable the delivery of power. It is to be appreciated that "controller" is a generic structural term that denotes structure(s) that control one or more modules, devices, and/or circuit components.

The principles of operation of the circuit 260 will be readily understood by those conversant with the art. When a person or thing moves close to the conductor 300, the increased capacitance therebetween causes the amplitude of the sinusoidal waveform at the output 320 to increase by a voltage sufficient to indicate the presence of the person or thing. Based on the increased signal level, the controller 330 can, for example, disable the cutting elements of the shredder, illuminate a sensor or error light, and/or activate an audible alert.

FIG. 9 illustrates a capacitive sensor circuit 360, as well as control and illumination circuitry 365. The capacitive sensor circuit 360 includes a conductor 400 that can have a configuration such as shown above or another suitable configuration. The conductor 400 is connected to a pad PI, which is in turn connected to series resistors R19 and R20. The resistor R19 is connected to circuit loops including a capacitor C4, a resistor R16, and a high-speed double diode D1. The loops are connected to a voltage supply Vcc, circuit ground, and a resistor R17. The voltage supply Vcc is connected to the AC line voltage of the shredder, and a negative regulator can generate −5 volts for the circuit ground. The capacitive sensor output 420 is coupled as an input to a controller 430, which can be, for example, a simple analog circuit or an ATtiny11 8-bit microcontroller offered by Atmel Corporation (San Jose, Calif.).

The principles of operation of the circuitry of FIG. 9 will be readily understood by those conversant with the art. When a person or thing moves close to the conductor 400, the increased capacitance therebetween causes the amplitude of the sinusoidal waveform at the output 420 to increase by a voltage sufficient to indicate the presence of the person or thing. Based on the increased signal level, the controller 430 sends appropriate control signals. For example, the controller 430 sends a control signal 490 to cut off power (such as supplied by a triac) to the motor that drives the cutting elements of the shredder, and a control signal 435 to illuminate a sensor LED 450 or error LED 440 coupled to comparators 460.

Embodiments of the present invention may be incorporated, for instance, in a shredder such as the PS80C-2 shredder of Fellowes, Inc. (Itasca, Ill.). If desired, existing shredder designs may be adapted, without major modification of existing modules, to incorporate proximity sensing circuitry.

In another embodiment of the invention, a shredder can provide two or more sensitivity settings for proximity sensing. The settings can be selectably enabled by a user and tailored to detect, e.g., infants or pets. In an example embodiment employing a capacitive sensor, objects are distinguished based on load times. A smaller capacitive load results in a shorter load time than a large capacitance. Thus, by measuring (e.g., with a microprocessor) differences in load times resulting from capacitive loads near a sensor, various objects can be distinguished.

Although various illustrated embodiments herein employ capacitive sensors, it is to be noted that other approaches may be employed to detect the presence of a person or thing near a shredder, such as, for example, approaches utilizing eddy current, inductive, photoelectric, ultrasonic, Hall effect, or infrared proximity sensor technologies.

The foregoing illustrated embodiments have been provided to illustrate the structural and functional principles of the present invention and are not intended to be limiting. To the contrary, the present invention is intended to encompass all modifications, alterations and substitutions within the spirit and scope of the appended claims.

What is claimed is:

1. A document shredder for shredding one or more data bearing documents selected from the group consisting of paper, optical discs, and floppy disks, comprising:

a housing;

a document shredder mechanism received in the housing and including an electrically powered motor and cutter elements, the document shredder mechanism enabling one or more data bearing documents selected from the group consisting of paper, optical discs, and floppy disks to be fed into the cutter elements and the motor being operable to drive the cutter elements so that the cutter elements shred the one or more documents fed therein;

the housing having an opening enabling the one or more data bearing documents to be fed therethrough into the cutter elements of the document shredder mechanism for shredding;

a waste bin disposed beneath the document shredder mechanism, the waste bin being configured to receive shredded documents from the document shredder mechanism, the waste bin being manually removable from beneath the document shredder mechanism for emptying of the shredded documents therein;

a discriminating proximity sensor comprising an electroconductive sensor element at least in part adjacent the opening, the proximity sensor being configured to indicate a presence of a person or animal, but not a presence of the one or more data bearing documents, in proximity to the opening based on the detection via the sensor element of an inherent electrical characteristic of the person or animal; and a controller operable to disable the cutter elements responsive to the indicated presence of the person or animal.

2. A shredder according to claim 1, wherein the cutter elements are disabled by disabling power to the motor responsive to the indicated presence of the person or animal.

3. A shredder according to claim 1, wherein the controller is also operable to illuminate an indicator responsive to the indicated presence of the person or animal.

4. A shredder according to claim 1, wherein the controller comprises a microcontroller.

5. A shredder according to claim 1, wherein the proximity sensor is a capacitive sensor for detecting a capacitance between the sensor element and the person or animal.

6. A shredder according to claim 5, wherein:

the proximity sensor further comprises circuitry to sense a state of the electroconductive sensor element.

7. A shredder according to claim 6, wherein the electroconductive element is a thin metal member extending along a portion of the housing adjacent the opening.

8. A shredder according to claim 7, wherein the metal member is provided on an interior surface of the housing.

9. A shredder according to claim 8, wherein the metal member is provided only on an interior surface of the housing, and not on an exterior surface.

10. A shredder according to claim 8, wherein the metal member is also provided on an exterior surface of the housing.

11. A shredder according to claim 10, wherein the portion of the housing on which the metal member is provided has an edge that defines part of the opening, and wherein the metal member extends from the interior surface of the housing to the exterior surface over the edge.

12. A shredder according to claim 7, wherein the shredder mechanism is embedded within the housing.

13. A shredder according to claim 7, wherein the metal member is at least in part adhered to the portion of the housing adjacent the opening.

14. A shredder according to claim 13, wherein the metal member comprises metal tape.

15. A shredder according to claim 7, wherein the metal member is at least in part covered by a non-conductive member.

16. A shredder according to claim 15, wherein the non-conductive member is at least in part covered by a conductive member.

17. A shredder according to claim 6, wherein the electroconductive element at least in part comprises metal paint applied to a portion of the housing or to a member associated with the housing.

18. A shredder according to claim 6, wherein the electroconductive element includes at least two metal members each extending along a portion of the housing adjacent the opening.

19. A shredder according to claim 1, wherein the controller at least in part comprises a microprocessor.

20. A shredder according to claim 1, wherein the controller at least in part comprises discrete circuit components.

21. A shredder according to claim 1, wherein the controller at least in part comprises an analog circuit.

22. A shredder according to claim 5, wherein the opening is an elongated, narrow opening.

23. A shredder according to claim 22, wherein the elongated, narrow opening is defined by a pair of opposing walls, and wherein the sensor element of the proximity sensor is attached to at least one of the walls.

24. A shredder according to claim 23, wherein the sensor element of the proximity sensor extends along the at least one of the walls for essentially an entire length of the opening.

25. A shredder according to claim 23, wherein the sensor element extends along both of the walls.

26. A shredder according to claim 25, wherein the sensor element extends along the walls for essentially an entire length of the opening.

27. A shredder according to claim 23, wherein the sensor element is provided on an external surface of the at least one of the walls and thereby defines the opening at least in part.

28. A shredder according to claim 24, wherein the sensor element is provided on an external surface of the at least one of the walls and thereby defines the opening at least in part.

29. A shredder according to claim 25, wherein the sensor element is provided on an external surface of both the walls and thereby defines the opening at least in part.

30. A shredder according to claim 26, wherein the sensor element is provided on an external surface of both the walls and thereby defines the opening at least in part.

31. A shredder according to claim 1, wherein:
wherein the proximity sensor further comprises circuitry to sense a state of the electroconductive sensor element.

32. A shredder according to claim 22, wherein:
wherein the proximity sensor further comprises circuitry to sense a state of the electroconductive sensor element.

33. A shredder according to claim 23, wherein:
the proximity sensor further comprises circuitry to sense a state of the electroconductive sensor element.

34. A shredder according to claim 24, wherein:
wherein the proximity sensor further comprises circuitry to sense a state of the electroconductive sensor element.

35. A shredder according to claim 25, wherein:
the proximity sensor further comprises circuitry to sense a state of the electroconductive sensor element.

36. A shredder according to claim 26, wherein:
the proximity sensor further comprises circuitry to sense a state of the electroconductive sensor element.

37. A shredder according to claim 27, wherein:
the proximity sensor further comprises circuitry to sense a state of the electroconductive sensor element.

38. A shredder according to claim 28, wherein:
the proximity sensor further comprises circuitry to sense a state of the electroconductive sensor element.

39. A shredder according to claim 29, wherein:
the proximity sensor further comprises circuitry to sense a state of the electroconductive sensor element.

40. A shredder according to claim 30, wherein:
the proximity sensor further comprises circuitry to sense a state of the electroconductive sensor element.

41. A shedder according to claim 1, wherein the proximity sensor is configured to indicate the presence of the person or the animal in proximity to the opening without requiring contact with the sensor element.

42. A shredder according to claim 22, wherein the proximity sensor is configured to indicate the presence of the person or the animal in proximity to the opening without requiring contact with the sensor element.

43. A shredder according to claim 23, wherein the proximity sensor is configured to indicate the presence of the person or the animal in proximity to the opening without requiring contact with the sensor element.

44. A shredder according to claim 24, wherein the proximity sensor is configured to indicate the presence of the person or the animal in proximity to the opening without requiring contact with the sensor element.

45. A shredder according to claim 25, wherein the proximity sensor is configured to indicate the presence of the person or the animal in proximity to the opening without requiring contact with the sensor element.

46. A shredder according to claim 26, wherein the proximity sensor is configured to indicate the presence of the person or the animal in proximity to the opening without requiring contact with the sensor element.

47. A shredder according to claim 27, wherein the proximity sensor is configured to indicate the presence of the person or the animal in proximity to the opening without requiring contact with the sensor element.

48. A shredder according to claim 28, wherein the proximity sensor is configured to indicate the presence of the person or the animal in proximity to the opening without requiring contact with the sensor element.

49. A shredder according to claim 29, wherein the proximity sensor is configured to indicate the presence of the person or the animal in proximity to the opening without requiring contact with the sensor element.

50. A shredder according to claim 30, wherein the proximity sensor is configured to indicate the presence of the person or the animal in proximity to the opening without requiring contact with the sensor element.

51. A shredder according to claim 41, wherein:
the proximity sensor further comprises circuitry to sense a state of the electroconductive sensor element.

52. A shredder according to claim 42, wherein:
the proximity sensor further comprises circuitry to sense a state of the electroconductive sensor element.

53. A shredder according to claim 43, wherein:
the proximity sensor further comprises circuitry to sense a state of the electroconductive sensor element.

54. A shredder according to claim 44, wherein:
the proximity sensor further comprises circuitry to sense a state of the electroconductive sensor element.

55. A shredder according to claim 45, wherein:
the proximity sensor further comprises circuitry to sense a state of the electroconductive sensor element.

56. A shredder according to claim 46, wherein:
the proximity sensor further comprises circuitry to sense a state of the electroconductive sensor element.

57. A shredder according to claim 47, wherein:
the proximity sensor further comprises circuitry to sense a state of the electroconductive sensor element.

58. A shredder according to claim 48, wherein:
the proximity sensor further comprises circuitry to sense a state of the electroconductive sensor element.

59. A shredder according to claim 49, wherein:
the proximity sensor further comprises circuitry to sense a state of the electroconductive sensor element.

60. A shredder according to claim 50, wherein:
the proximity sensor further comprises circuitry to sense a state of the electroconductive sensor element.

61. A shredder according to claim 6, wherein the cutter elements are disabled by disabling power to the motor responsive to the indicated presence of the person or animal.

62. A shredder according to claim 22, wherein the cutter elements are disabled by disabling power to the motor responsive to the indicated presence of the person or animal.

63. A shredder according to claim 23, wherein the cutter elements are disabled by disabling power to the motor responsive to the indicated presence of the person or animal.

64. A shredder according to claim 24, wherein the cutter elements are disabled by disabling power to the motor responsive to the indicated presence of the person or animal.

65. A shredder according to claim 25, wherein the cutter elements are disabled by disabling power to the motor responsive to the indicated presence of the person or animal.

66. A shredder according to claim 26, wherein the cutter elements are disabled by disabling power to the motor responsive to the indicated presence of the person or animal.

67. A shredder according to claim 31, wherein the cutter elements are disabled by disabling power to the motor responsive to the indicated presence of the person or animal.

68. A shredder according to claim 32, wherein the cutter elements are disabled by disabling power to the motor responsive to the indicated presence of the person or animal.

69. A shredder according to claim 33, wherein the cutter elements are disabled by disabling power to the motor responsive to the indicated presence of the person or animal.

70. A shredder according to claim 34, wherein the cutter elements are disabled by disabling power to the motor responsive to the indicated presence of the person or animal.

71. A shredder according to claim 35, wherein the cutter elements are disabled by disabling power to the motor responsive to the indicated presence of the person or animal.

72. A shredder according to claim 36, wherein the cutter elements are disabled by disabling power to the motor responsive to the indicated presence of the person or animal.

73. A shredder according to claim 41, wherein the cutter elements are disabled by disabling power to the motor responsive to the indicated presence of the person or animal.

74. A shredder according to claim 42, wherein the cutter elements are disabled by disabling power to the motor responsive to the indicated presence of the person or animal.

75. A shredder according to claim 43, wherein the cutter elements are disabled by disabling power to the motor responsive to the indicated presence of the person or animal.

76. A shredder according to claim 44, wherein the cutter elements are disabled by disabling power to the motor responsive to the indicated presence of the person or animal.

77. A shredder according to claim 45, wherein the cutter elements are disabled by disabling power to the motor responsive to the indicated presence of the person or animal.

78. A shredder according to claim 46, wherein the cutter elements are disabled by disabling power to the motor responsive to the indicated presence of the person or animal.

79. A shredder according to claim 5, wherein the opening is an elongated opening.

80. A shredder according to claim 79, wherein the elongated opening is defined by a pair of opposing walls, and wherein the sensor element of the proximity sensor is attached to at least one of the walls.

81. A shredder according to claim 80, wherein the sensor element of the proximity sensor extends along the at least one of the walls for essentially an entire length of the opening.

82. A shredder according to claim 80, wherein the sensor element extends along both of the walls.

83. A shredder according to claim 82, wherein the sensor element extends along the walls for essentially an entire length of the opening.

84. A shredder according to claim 80, wherein the sensor element is provided on an external surface of the at least one of the walls and thereby defines the opening at least in part.

85. A shredder according to claim 81, wherein the sensor element is provided on an external surface of the at least one of the walls and thereby defines the opening at least in part.

86. A shredder according to claim 82, wherein the sensor element is provided on an external surface of both the walls and thereby defines the opening at least in part.

87. A shredder according to claim 83, wherein the sensor element is provided on an external surface of both the walls and thereby defines the opening at least in part.

88. A shredder according to claim 79, wherein:

the proximity sensor further comprises circuitry to sense a state of the electroconductive sensor element.

89. A shredder according to claim 80, wherein:

the proximity sensor further comprises circuitry to sense a state of the electroconductive sensor element.

90. A shredder according to claim 81, wherein:

the proximity sensor further comprises circuitry to sense a state of the electroconductive sensor element.

91. A shredder according to claim 82, wherein:

the proximity sensor further comprises circuitry to sense a state of the electroconductive sensor element.

92. A shredder according to claim 83, wherein:

the proximity sensor further comprises circuitry to sense a state of the electroconductive sensor element.

93. A shredder according to claim 84, wherein:

the proximity sensor further comprises circuitry to sense a state of the electroconductive sensor element.

94. A shredder according to claim 85, wherein:

the proximity sensor further comprises circuitry to sense a state of the electroconductive sensor element.

95. A shredder according to claim 86, wherein:

the proximity sensor further comprises circuitry to sense a state of the electroconductive sensor element.

96. A shredder according to claim 87, wherein:

the proximity sensor further comprises circuitry to sense a state of the electroconductive sensor element.

97. A shredder according to claim 1, wherein the opening is an elongated, narrow opening.

98. A shredder according to claim 97, wherein the elongated, narrow opening is defined by a pair of opposing walls, and wherein the sensor element of the proximity sensor is attached to at least one of the walls.

99. A shredder according to claim 98, wherein the sensor element of the proximity sensor extends along the at least one of the walls for essentially an entire length of the opening.

100. A shredder according to claim 98, wherein the sensor element extends along both of the walls.

101. A shredder according to claim 100, wherein the sensor element extends along the walls for essentially an entire length of the opening.

102. A shredder according to claim 98, wherein the sensor element is provided on an external surface of the at least one of the walls and thereby defines the opening at least in part.

103. A shredder according to claim 99, wherein the sensor element is provided on an external surface of the at least one of the walls and thereby defines the opening at least in part.

104. A shredder according to claim 100, wherein the sensor element is provided on an external surface of both the walls and thereby defines the opening at least in part.

105. A shredder according to claim 101, wherein the sensor element is provided on an external surface of both the walls and thereby defines the opening at least in part.

106. A shredder according to claim 1, wherein the opening is an elongated opening.

107. A shredder according to claim 106, wherein the elongated opening is defined by a pair of opposing walls, and wherein the sensor element of the proximity sensor is attached to at least one of the walls.

108. A shredder according to claim 107, wherein the sensor element of the proximity sensor extends along the at least one of the walls for essentially an entire length of the opening.

109. A shredder according to claim 107, wherein the sensor element extends along both of the walls.

110. A shredder according to claim 109, wherein the sensor element extends along the walls for essentially an entire length of the opening.

111. A shredder according to claim 107, wherein the sensor element is provided on an external surface of the at least one of the walls and thereby defines the opening at least in part.

112. A shredder according to claim 108, wherein the sensor element is provided on an external surface of the at least one of the walls and thereby defines the opening at least in part.

113. A shredder according to claim 109, wherein the sensor element is provided on an external surface of both the walls and thereby defines the opening at least in part.

114. A shredder according to claim 110, wherein the sensor element is provided on an external surface of both the walls and thereby defines the opening at least in part.

* * * * *

US007311276C1

(12) EX PARTE REEXAMINATION CERTIFICATE (7489th)

United States Patent

(10) Number: US 7,311,276 C1

(45) Certificate Issued: May 4, 2010

Matlin et al.

(54) SHREDDER WITH PROXIMITY SENSING SYSTEM

(75) Inventors: Taihoon K. Matlin, Round Lake Beach, IL (US); Eric Gach, Mount Prospect, IL (US)

(73) Assignee: Fellowes Inc., Itasca, IL (US)

Reexamination Request:
No. 90/009,230, Aug. 28, 2008

Reexamination Certificate for:

| | |
|---|---|
| Patent No.: | **7,311,276** |
| Issued: | **Dec. 25, 2007** |
| Appl. No.: | **10/937,304** |
| Filed: | **Sep. 10, 2004** |

(51) Int. Cl.

| | |
|---|---|
| ***A01F 21/00*** | (2006.01) |
| ***B02C 23/00*** | (2006.01) |
| ***B23Q 11/00*** | (2006.01) |

(52) U.S. Cl. ...................................... 241/37.5; 241/236

(58) Field of Classification Search ................. 241/37.5, 241/236
See application file for complete search history.

(56) References Cited

U.S. PATENT DOCUMENTS

| | | | | |
|---|---|---|---|---|
| 3,619,537 | A | 11/1971 | Nara et al. | |
| 3,764,819 | A | 10/1973 | Muller | |
| 3,785,230 | A | 1/1974 | Lokey | |
| 3,829,580 | A | 8/1974 | Guetersloh | |
| 3,947,734 | A * | 3/1976 | Fyler | 361/181 |
| 4,352,980 | A | 10/1982 | Hibari | |
| 4,489,897 | A | 12/1984 | Turner | |
| 4,497,478 | A | 2/1985 | Reschenhofer | |
| 4,683,381 | A | 7/1987 | Dufoug | |
| 4,707,704 | A | 11/1987 | Allen | |
| 4,757,949 | A | 7/1988 | Horton | |
| 4,814,632 | A | 3/1989 | Glaeser | |
| 4,914,721 | A | 4/1990 | Glaeser | |
| 5,017,972 | A | 5/1991 | Daughton | |
| 5,081,406 | A | 1/1992 | Hughes et al. | |
| 5,166,679 | A | 11/1992 | Vranish et al. | |
| 5,186,398 | A | 2/1993 | Vigneau, Jr. | |
| 5,342,033 | A | 8/1994 | Iwata | |
| 5,345,138 | A | 9/1994 | Mukaidono et al. | |
| 5,353,468 | A | 10/1994 | Yap | |
| 5,397,890 | A | 3/1995 | Schueler et al. | |
| 5,415,355 | A | 5/1995 | Gollwitzer | |
| 5,429,313 | A | 7/1995 | Schwelling | |
| 5,436,613 | A | 7/1995 | Ghosh et al. | |
| 5,453,644 | A | 9/1995 | Yap | |
| 5,494,229 | A | 2/1996 | Rokos | |
| 5,823,529 | A | 10/1998 | Mandel | |
| 5,850,342 | A | 12/1998 | Nakamura et al. | |
| 5,897,065 | A | 4/1999 | Schwelling | |
| 5,924,637 | A | 7/1999 | Niederholtmeyer | |
| D412,716 | S | 8/1999 | Kroger | |
| 5,942,975 | A | 8/1999 | Sorensen | |
| D414,198 | S | 9/1999 | Iwata | |
| 5,988,542 | A | 11/1999 | Henreckson | |
| 6,065,696 | A | 5/2000 | Tsai | |
| D426,805 | S | 6/2000 | Iwata | |
| 6,079,645 | A | 6/2000 | Henreckson | |

(Continued)

FOREIGN PATENT DOCUMENTS

| | | |
|---|---|---|
| DE | 3313232 | 10/1984 |
| DE | 8619856.4 | 10/1988 |
| DE | 4121330 | 1/1993 |

(Continued)

OTHER PUBLICATIONS

U.S. Appl. No. 60/686,490, filed May 31, 2005, Pierce.
U.S. Appl. No. 60/613,750, filed Sep. 27, 2004, Pierce.
U.S. Appl. No. 60/688,285, filed Jun. 7, 2005, Pierce.

(Continued)

*Primary Examiner*—Jimmy G Foster

(57) ABSTRACT

The present invention relates to a shredder that includes a proximity sensing system to sense the presence of a person, animal, or object near cutting elements of the shredder.

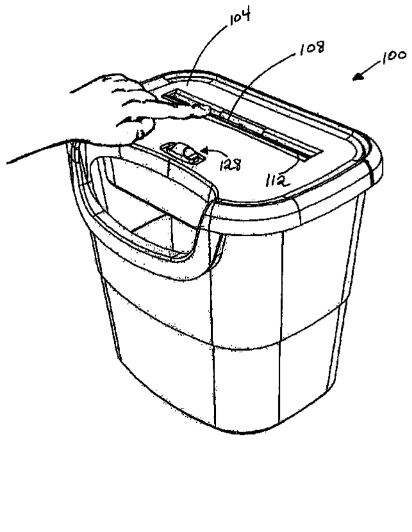

U.S. PATENT DOCUMENTS

| | | | | |
|---|---|---|---|---|
| 6,116,528 | A | | 9/2000 | Schwelling |
| 6,265,682 | B1 | | 7/2001 | Lee |
| 6,376,939 | B1 | | 4/2002 | Suzuki et al. |
| 6,418,004 | B1 | | 7/2002 | Mather et al. |
| 6,587,093 | B1 | * | 7/2003 | Shaw et al. ................. 345/163 |
| 6,655,943 | B1 | | 12/2003 | Peterson |
| 6,676,460 | B1 | | 1/2004 | Motsenbocker |
| 6,698,640 | B2 | | 3/2004 | Hakozaki |
| 6,724,324 | B1 | | 4/2004 | Lambert |
| 6,813,983 | B2 | | 11/2004 | Gass et al. |
| 6,826,988 | B2 | | 12/2004 | Gass |
| 6,857,345 | B2 | | 2/2005 | Gass |
| 6,877,410 | B2 | | 4/2005 | Gass et al. |
| 6,880,440 | B2 | | 4/2005 | Gass et al. |
| 6,920,814 | B2 | | 7/2005 | Gass et al. |
| 6,979,813 | B2 | | 12/2005 | Avril |
| 7,040,559 | B2 | | 5/2006 | Matlin |
| 7,166,561 | B2 | | 1/2007 | Allen |
| 2002/0017175 | A1 | | 2/2002 | Gass et al. |
| 2002/0017176 | A1 | | 2/2002 | Gass et al. |
| 2002/0017178 | A1 | | 2/2002 | Gass et al. |
| 2002/0017179 | A1 | | 2/2002 | Gass et al. |
| 2002/0017180 | A1 | | 2/2002 | Gass et al. |
| 2002/0017181 | A1 | | 2/2002 | Gass et al. |
| 2002/0017182 | A1 | | 2/2002 | Gass et al. |
| 2002/0017183 | A1 | | 2/2002 | Gass |
| 2002/0017184 | A1 | | 2/2002 | Gass et al. |
| 2002/0017336 | A1 | | 2/2002 | Gass et al. |
| 2002/0020261 | A1 | | 2/2002 | Gass et al. |
| 2002/0020262 | A1 | | 2/2002 | Gass et al. |
| 2002/0020263 | A1 | | 2/2002 | Gass et al. |
| 2002/0020265 | A1 | | 2/2002 | Gass et al. |
| 2002/0020271 | A1 | | 2/2002 | Gass et al. |
| 2002/0056348 | A1 | | 5/2002 | Gass et al. |
| 2002/0056349 | A1 | | 5/2002 | Gass et al. |
| 2002/0056350 | A1 | | 5/2002 | Gass et al. |
| 2002/0059853 | A1 | | 5/2002 | Gass et al. |
| 2002/0059854 | A1 | | 5/2002 | Gass et al. |
| 2002/0059855 | A1 | | 5/2002 | Gass et al. |
| 2002/0066346 | A1 | | 6/2002 | Gass et al. |
| 2002/0069734 | A1 | | 6/2002 | Gass et al. |
| 2002/0170399 | A1 | | 11/2002 | Gass et al. |
| 2002/0170400 | A1 | | 11/2002 | Gass |
| 2002/0190581 | A1 | | 12/2002 | Gass et al. |
| 2003/0002942 | A1 | | 1/2003 | Gass et al. |
| 2003/0005588 | A1 | | 1/2003 | Gass et al. |
| 2003/0015253 | A1 | | 1/2003 | Gass et al. |
| 2003/0019341 | A1 | | 1/2003 | Gass et al. |
| 2003/0020336 | A1 | | 1/2003 | Gass et al. |
| 2003/0037651 | A1 | | 2/2003 | Gass et al. |
| 2003/0056853 | A1 | | 3/2003 | Gass et al. |
| 2003/0058121 | A1 | | 3/2003 | Gass et al. |
| 2003/0090224 | A1 | | 5/2003 | Gass et al. |
| 2003/0117023 | A1 | | 6/2003 | Avril |
| 2003/0131703 | A1 | | 7/2003 | Gass et al. |
| 2003/0140749 | A1 | | 7/2003 | Gass et al. |
| 2003/0196824 | A1 | | 10/2003 | Gass et al. |
| 2004/0008122 | A1 | * | 1/2004 | Michael ................... 340/686.1 |
| 2004/0040426 | A1 | | 3/2004 | Gass et al. |
| 2004/0069883 | A1 | | 4/2004 | Watanabe et al. |
| 2004/0159198 | A1 | | 8/2004 | Peot et al. |
| 2004/0163514 | A1 | | 8/2004 | Gass et al. |
| 2004/0173430 | A1 | | 9/2004 | Gass |
| 2004/0194594 | A1 | * | 10/2004 | Dils et al. ...................... 83/13 |
| 2004/0226800 | A1 | | 11/2004 | Pierga |
| 2005/0039588 | A1 | | 2/2005 | Gass et al. |
| 2005/0039822 | A1 | | 2/2005 | Gass et al. |
| 2005/0041359 | A1 | | 2/2005 | Gass |
| 2005/0066784 | A1 | | 3/2005 | Gass |
| 2005/0103510 | A1 | | 5/2005 | Gass et al. |
| 2005/0137056 | A1 | | 6/2005 | Gass et al. |
| 2005/0139051 | A1 | | 6/2005 | Gass et al. |
| 2005/0139057 | A1 | | 6/2005 | Gass et al. |
| 2005/0139058 | A1 | | 6/2005 | Gass et al. |
| 2005/0139459 | A1 | | 6/2005 | Gass et al. |
| 2005/0150986 | A1 | | 7/2005 | Castronovo |
| 2005/0155473 | A1 | | 7/2005 | Gass |
| 2005/0166736 | A1 | | 8/2005 | Gass et al. |
| 2006/0016919 | A1 | | 1/2006 | Castronovo |
| 2006/0091247 | A1 | | 5/2006 | Matlin |
| 2006/0243631 | A1 | | 11/2006 | Duke |
| 2007/0080252 | A1 | | 4/2007 | Pierce |
| 2007/0087942 | A1 | | 4/2007 | Allen |
| 2007/0164135 | A1 | | 7/2007 | Zhong |
| 2007/0164138 | A1 | | 7/2007 | Allen |
| 2007/0215728 | A1 | | 9/2007 | Priester |
| 2009/0032629 | A1 | | 2/2009 | Aries et al. |

FOREIGN PATENT DOCUMENTS

| | | |
|---|---|---|
| DE | 19835093 | 2/1999 |
| DE | 202004000907 | 5/2005 |
| DE | 102006036136 | 1/2008 |
| EP | 0268244 | 11/1987 |
| EP | 0562076 | 9/1992 |
| EP | 0524708 | 1/1997 |
| EP | 0856945 | 1/1998 |
| EP | 0855221 | 7/1998 |
| EP | 2022566 | 2/2009 |
| GB | 1199903 | 7/1970 |
| GB | 2171029 | 8/1986 |
| GB | 2440651 | 2/2008 |
| JP | 52-11691 | 3/1977 |
| JP | 57-73734 | 2/1982 |
| JP | 57-76734 | 2/1982 |
| JP | 04-157093 | 5/1992 |
| JP | 04-0180852 | 6/1992 |
| JP | 6-277548 | 10/1994 |
| JP | 7-299377 | 11/1995 |
| JP | 09-150069 | 10/1997 |
| JP | 9-262491 | 10/1997 |
| JP | 10-048344 | 2/1998 |
| JP | 11-216383 | 8/1999 |
| JP | 11-304942 | 11/1999 |
| JP | 2000034628 | 12/2000 |
| JP | 2000-346288 | 12/2000 |
| JP | 2002-239405 | 8/2002 |
| JP | 2002239405 | 8/2002 |
| JP | 2004321993 | 11/2004 |
| WO | 2005070553 | 8/2005 |
| WO | 2006036370 | 4/2006 |
| WO | 2007109753 | 9/2007 |
| WO | 2007122364 | 11/2007 |

OTHER PUBLICATIONS

Examination Report for Australian Patent Application No. 2008202504, mailed Mar. 13, 2009.

Office Action for Chinese Patent Application No. 200580034478.5, mailed Apr. 10, 2009.

Judgment regarding Appeal No. 2000–26479 for Japanese Patent Application No. 2005–261612, dated Apr. 6, 2009.

Notice of Allowance for Russian Patent Application No. 2007108715, dated May 6, 2009.

International Search Report and Written Opinion for PCT/US2005/028290 dated Nov. 21, 2005.

SEM Advertisement for LK–3 Automatic Oiling System.

Advertisement for Auto–Lube.

1$^{st}$ Paper Shredder—Advertisement for DAHLE Automatic Oiler/Paper Shredder Oiling Accessory.

Instructions for Installing a Shredder Oiling System from www.compax.com.
Full–Size Picture of Shreeder with LK–3 Oiling System.
Picture of Unknown Shredder with Oil Container on Side.
Invitation to Pay Additional Fees with Partial International Search Report in PCT/US2007/064601, Sep. 12, 2007, 8 pages.
Search Report issued in European Patent Application No. 08102126.3, May 19, 2008, 5 pages.
Partial International Search Report issued with Invitation to Pay Additional Fees issued in PCT/US2008/078458, Jan. 26, 2009, 2 pages.
Search Report issued in European patent application No. 08170857.0, Feb. 10, 2009, 6 pages.
Notification of Transmittal of International Search Report, Search Report and Written Opinion of the International Searching Authority for PCT/US2008/078458, mailed Mar. 30, 2009, 21 pages.
Notification of Transmittal of International Search Report, Search Report and Written Opinion of the International Searching Authority for PCT/2007/064601, mailed Feb. 8, 2008, 21 pages.
International Preliminary Examination Report for PCT/US2005/028290, mailed Oct. 22, 2008.
International Preliminary Examination Report for PCT/US2007/064601, mailed Sep. 23, 2008.
Examination Report for European Patent Application No. 08102126.3, mailed Mar. 4, 2009.
Examination Report for Australian Patent Application No. 2005285398, mailed Feb. 22, 2008.
Notice of Acceptance for Australian Patent Application No. 2005285398, mailed Apr. 15, 2008.
Examination Report for Australian Patent Application No. 2008100182, mailed Jul. 7, 2008.
Office Action for Canadian Patent Application No. 2,579,137, mailed on May 21, 2009.
TI's Digital Signal Controllers Put Brake on SawStop Table Saw, Feb. 9, 2005, pp. 1–3, (printed from www.embedded-star.com/press/content/2005/2/embedded17827.html).
Examination Report for European Patent Application No. 05784240.3, mailed on Mar. 31, 2008.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 22, 79–97 and 106 are cancelled.

Claims 1, 23, 32, 42, 62, 98, 99 and 107 are determined to be patentable as amended.

Claims 2–21, 24–31, 33–41, 43–61, 63–78, 100–105 and 108–114, dependent on an amended claim, are determined to be patentable.

New claims 115–121 are added and determined to be patentable.

1. A document shredder for shredding one or more data bearing documents selected from the group consisting of paper, optical discs, and floppy disks, comprising:

a housing;

a document shredder mechanism received in the housing and including an electrically powered motor and cutter elements, the document shredder mechanism enabling one or more data bearing documents selected from the group consisting of paper, optical discs, and floppy disks to be fed into the cutter elements and the motor being operable to drive the cutter elements so that the cutter elements shred the one or more documents fed therein;

the housing having [an] *a narrow, elongated* opening enabling the one or more data bearing documents to be fed therethrough into the cutter elements of the document shredder mechanism for shredding;

a waste bin disposed beneath the document shredder mechanism, the waste bin being configured to receive shredded documents from the document shredder mechanism, the waste bin being manually removable from beneath the document shredder mechanism for emptying of the shredded documents therein;

a discriminating proximity sensor comprising an electroconductive sensor element at least in part adjacent the opening, *said electroconductive sensor element being positioned between opposing longitudinal ends of the opening and extending in a longitudinal direction of the narrow, elongated opening to provide sensor coverage along essentially the entire length of the opening,* the proximity sensor being configured to indicate a presence of a person or animal, but not a presence of the one or more bearing documents, in proximity to the opening based on the detection via the sensor element of an inherent electrical characteristic of the person or animal; and a controller operable to disable the cutter elements responsive to the indicated presence of the person or animal.

23. A shredder according to claim [22] *5*, wherein the elongated, narrow opening is defined by a pair of opposing walls, and wherein the sensor element of the proximity sensor is attached to at least one of the walls.

32. A shredder according to claim [22] *5*, wherein:

wherein the proximity sensor further comprises circuitry to sense a state of the electroconductive element.

42. A shredder according to claim [22] *5*, wherein the proximity sensor is configured to indicate the presence of the person or the animal in proximity to the opening without requiring contact with the sensor element.

62. A shredder according to claim [22] *5*, wherein the cutter elements are disabled by disabling power to the motor responsive to the indicated presence of the person or animal.

98. A shredder according to claim [97] *1*, wherein the elogated, narrow opening is defined by a pair of opposing walls, and wherein the sensor element of the proximity sensor is attached to at least one of the walls.

99. A *document* shredder [according to claim 98,] *for shredding one or more data bearing documents selected from the group consisting of paper, optical discs, and floppy disks, comprising:*

*a housing;*

*a document shredder mechanism received in the housing and including an electrically powered motor and cutter elements, the document shredder mechanism enabling one or more data bearing documents selected from the group consisting of paper, optical discs, and floppy disks to be fed into the cutter elements and the motor being operable to drive the cutter elements so that the cutter elements shred the one or more documents fed therein;*

*the housing having an opening enabling the one or more data bearing documents to be fed therethrough into the cutter elements of the document shredder mechanism for shredding;*

*a waste bin disposed beneath the document shredder mechanism, the waste bin being configured to receive shredded documents from the document shredder mechanism, the waste bin being manually removable from beneath the document shredder mechanism for emptying of the shredded documents therein;*

*a discriminating proximity sensor comprising an electroconductive sensor element at least in part adjacent the opening, the proximity sensor being configured to indicate a presence of a person or animal, but not a presence of the one or more data bearing documents, in proximity to the opening based on the detection via the sensor element of an inherent electrical characteristic of the person or animal; and*

*a controller operable to disable the cutter elements responsive to the indicated presence of the person or animal;*

*wherein the opening is an elongated, narrow opening;*

*wherein the elongated, narrow opening is defined by a pair of opposing walls, and wherein the sensor element of the proximity sensor is attached to at least one of the walls; and* wherein the sensor element of the proximity sensor extends along at least one of the walls for essentially an entire length of the opening.

107. A shredder according to claim [106] *1*, wherein the elongated opening is defined by a pair of opposing walls, and wherein the sensor element of the proximity sensor is attached to at least one of the walls.

*115. A shredder according to claim 1, wherein the electroconductive sensor element is elongated in the longitudinal direction of the elongated opening.*

*116. A shredder according to claim 1, wherein the electroconductive sensor element extends adjacent the opening along an entire elongated length of the elongated opening.*

*117. A shredder according to claim 1, wherein the electroconductive sensor element is one electrode of a capacitor and wherein the sensor is configured to detect a mutual capacitance between the electroconductive sensor element and the person or animal.*

*118. A shredder according to claim 1, wherein the electroconductive sensor element consists of a single electrode of a capacitor and wherein the sensor is configured to detect a mutual capacitance between the single electroconductive sensor element and the person or animal.*

*119. A shredder according to claim 103, wherein:*

*the electroconductive sensor element is one electrode of a capacitor;*

*the sensor is configured to detect a mutual capacitance between the electroconductive sensor element and the person or animal;*

*the cutter elements are disabled by disabling power to the motor responsive to the indicated presence of the person or animal; and*

*the at least one of the walls and the sensor element of the proximity sensor curve toward the cutter elements as they progress into the opening toward the cutter elements.*

*120. A shredder according to claim 1, wherein the sensor extends over an entire longitudinal length of the narrow, elongated opening.*

*121. A shredder according to claim 99, wherein the sensor element of the proximity sensor extends along the at least one of the walls for essentially an entire length of the opening to provide sensor coverage along essentially the entire length of the opening.*

* * * * *